United States Patent [19]
Baird et al.

[11] Patent Number: 4,952,004
[45] Date of Patent: Aug. 28, 1990

[54] IMPROVED KALEIDOSCOPIC DEVICE

[76] Inventors: Steve Baird; Ursula Baird, both of 307 Oreland Mill Rd., Oreland, Pa. 19075

[21] Appl. No.: 360,344

[22] Filed: Jun. 2, 1989

[51] Int. Cl.$^5$ .............................................. G02B 23/00
[52] U.S. Cl. ...................................... 350/4.1; 350/4.2
[58] Field of Search ..................... 350/4.1, 4.2; 353/1, 353/2

[56] References Cited

U.S. PATENT DOCUMENTS

| | | | |
|---|---|---|---|
| 169,882 | 11/1875 | Adams | 350/4.1 |
| 1,968,759 | 7/1934 | Gill et al. | 350/4.1 |
| 2,298,966 | 10/1942 | Quakenbush | 350/4.2 |
| 3,567,306 | 3/1971 | Spear | 350/4.1 |
| 3,603,663 | 9/1971 | Lewis | 350/4.1 |

Primary Examiner—Richard A. Wintercorn

[57] ABSTRACT

A device for producing design images similar to those of a kaleidoscope, but without the "scope" or "tube". The device comprises a box containing adjoining mirrors which produce design images from objects that are placed in a round turnable dish at the base of the mirrors. Moving design images are produced by turning the edge of the dish from right behind where the mirrors are joined. The images may be viewed with both eyes at a distance from the box, and more than one person simultaneously. The device also contains light and power sources to maintain bright, clear images.

6 Claims, 2 Drawing Sheets

IMPROVED KALEIDOSCOPIC DEVICE

BACKGROUND OF THE INVENTION

1. Field of the Invention

The invention is a box containing adjoining mirrors which create design images from objects placed in a turnable dish.

2. Description of the Prior Art

The images are similar to those of kaleidoscopes, however the improved device has the following advantages:
- (a) Larger images which can be viewed with both eyes, and by more than one person simultaneously.
- (b) A built-in light source for images that are constantly bright and clear.

SUMMARY OF THE INVENTION

The invention provides beautiful design images similar to those of kaleidoscopes but without the limitations of the kaleidoscope "scope" or "tube". The images are displayed from within a box with the use of adjoining mirrors that are mounted inside the box. The images that are produced are larger than those of kaleidoscopes, and while kaleidscopes are held against an eye, the improved device may rest at a distance while being viewed with both eyes. Small children and handicapped persons who are unable to use a kaleidoscope will be able to enjoy the similar type designs produced by the improved device.

DESCRIPTION OF THE PREFERRED EMBODIMENT

Figure 1:
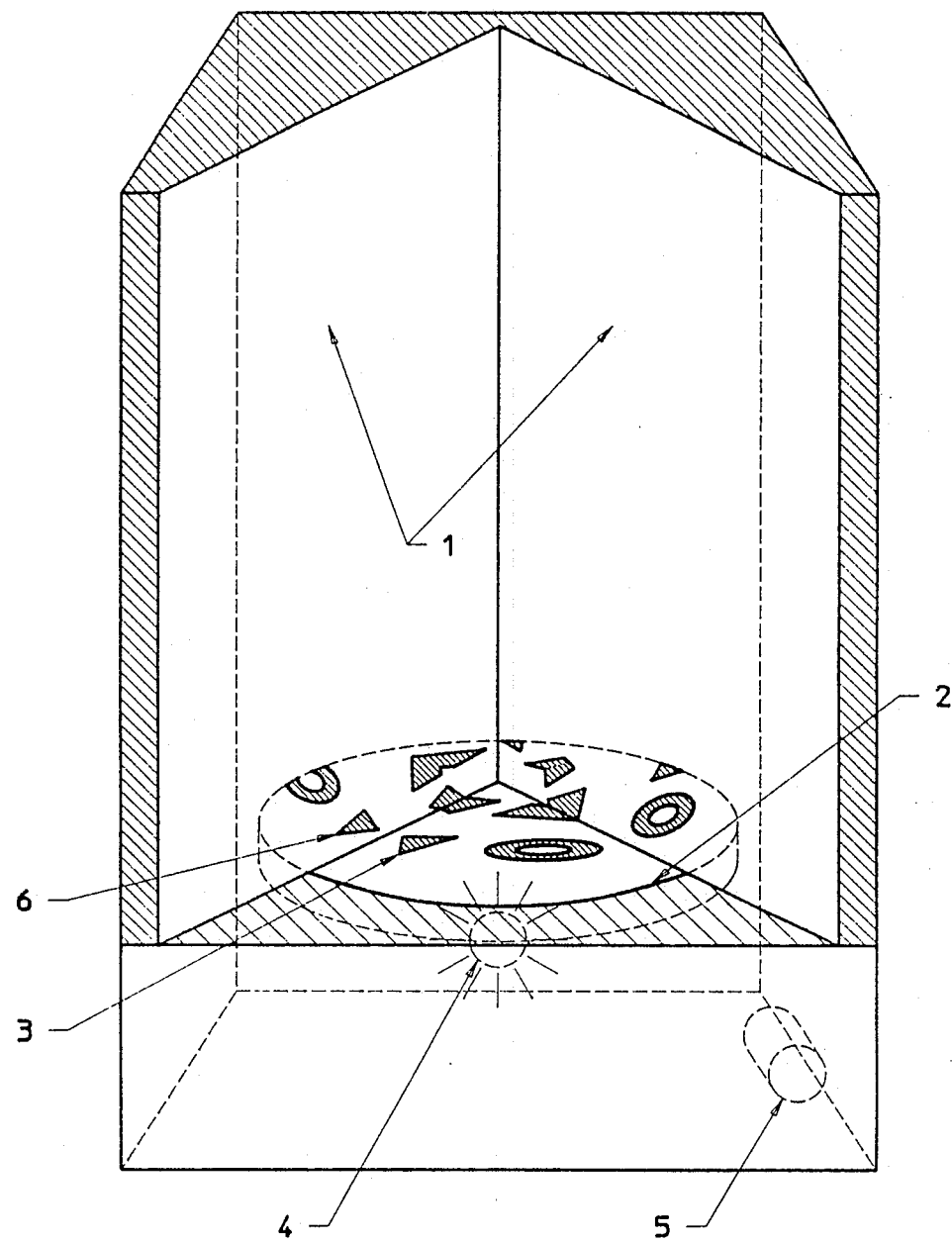
FIG. 1 is a front elevation view of the improved device showing all of its main components.
Figure 2:
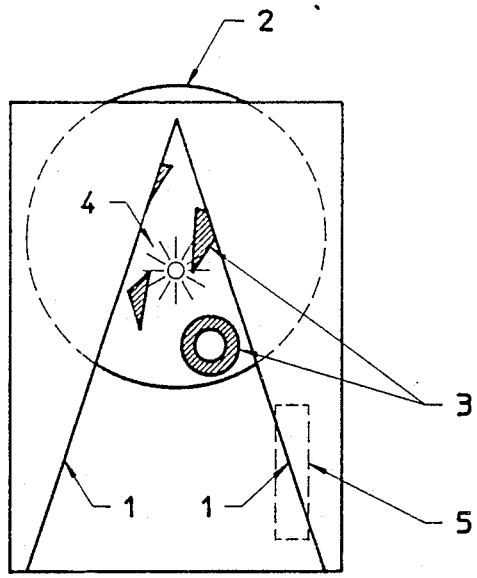
FIG. 2 is a top view of the device.
Figure 3:
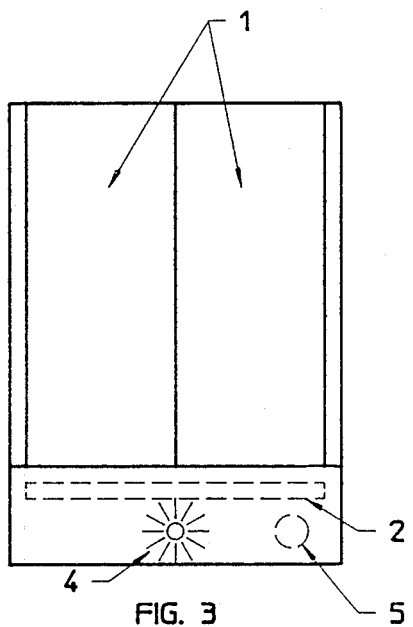
FIG. 3 is a front view of the device.
Figure 4:
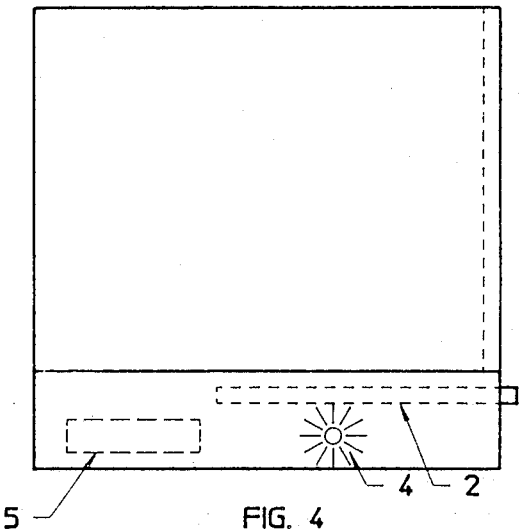
FIG. 4 is a right side view of the device.

Referring to FIGS. 1, 2, 3, and 4, an embodiment of the improved device is shown. In this embodiment two adjoining mirrors 1 are mounted inside of a box. A translucent support member in the form of a round turnable dish or table 2 containing objects 3 for reflection is inserted through the lower back of the box so that it is at the base of the mirrors 1. A bright, clear design image is produced when light bulb 4, which is powered by the battery 5, is switched on to energize the light bulb. The light bulb provides a source of light below the support dish 2, which shows up through the dish to illuminate the objects 3. The dish may then be rotated about an upright axis to produce moving design images.

Although one detailed embodiment of the invention is illustrated in the drawings and previously described in detail, this invention contemplates any configuration, design and relationship of components which will function in a similar manner and which will provide equivalent design results.

This includes the use of any movable translucent means to create a display for obtaining design images, besides the turnable table depicted in the preferred embodiment. The said means could operate manually and/or automatically with various types of power sources. The invention also contemplates the possible use of mirrors with an adjustable adjoining angle to vary images produced, and the possible use of more than two mirrors.

I claim:

1. A device which comprises:
   - (a) a removable turnable translucent dish, which holds objects to be reflected;
   - (b) reflective surfaces not contained in a scope or tube, as a means of producing design images, and
   - (c) a light source below said dish to shine up through said dish to illuminate the objects to be reflected from below.

2. An improved kaleidoscopic device comprising:
   - (a) a box;
   - (b) a plurality of angularly-related reflective surfaces having bases mounted in said box;
   - (c) a translucent means having design objects mounted for movement in said box adjacent the bases of said reflective surfaces to create a display of design images; and
   - (d) a light source within said box positioned to shine through said translucent means to illuminate the design objects for reflection of design images by said reflective surfaces.

3. A device according to claim 2 wherein said box mounts said reflective surfaces so that the images reflected may be viewed with multiple eyes at a distance from the box.

4. A device according to claim 2 wherein said translucent means comprises a dish operable to support design objects loosely thereon for producing the design images.

5. A device according to claim 4 wherein said dish is mounted for rotation about an upright axis.

6. A device according to claim 1 including means in said box to energize said light source.

* * * * *